Patented Sept. 22, 1953

2,653,153

UNITED STATES PATENT OFFICE 2,653,153

4-N-SUBSTITUTED-2-KETOPIPERAZINES

Peter L. de Benneville, Philadelphia, Pa., assignor to Rohm & Haas Company, Philadelphia, Pa., a corporation of Delaware No Drawing. Application February 8, 1952,
Serial No. 270,769

12 Claims. (Cl. 260—268)

This invention concerns substituted ketopiperazines of the formula

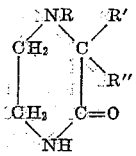

wherein R is an alkyl, tertiary aminoalkyl, or aralkyl group, and R' and R'' represent hydrogen or lower alkyl groups. This invention also deals with a method for preparing these compounds.

It has been found that a ketopiperazine of the formula

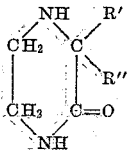

reacts with aldehydes and formic acid to yield the mono-N-substituted ketopiperazines of this invention. There thus become available ketopiperazines in which there is a tertiary amino nitrogen and an amido nitrogen carrying a hydrogen atom which can be reacted to give a great variety of other new compounds. The amido nitrogen reacts with formaldehyde, for example, to give a definite product—a methylol derivative—without resin formation. The compounds themselves are valuable activators and synergists for insecticidal agents such as the pyrethrins, allethrin, and the like.

As a ketopiperazine there may be used any of the 2-ketopiperazines having hydrogens on the nitrogen atoms thereof. Of particular importance are 2-ketopiperazine itself, 3-methyl-2-ketopiperazine, 3,3-dimethyl-2-ketopiperazine, 3-methyl-3-ethyl-2-ketopiperazine, 3-ethyl-2-ketopiperazine, 3-propyl-2-ketopiperazine, 3-methyl-3-ethyl-2-ketopiperazine, 3-butyl-2-ketopiperazine, 3-octyl-2-ketopiperazine, etc. R' or R'' groups up to eight carbon atoms are particularly useful and available, these being designated as lower alkyl groups.

As an aldehyde there may be used an aliphatic aldehyde, R°CHO, such as formaldehyde, acetaldehyde, propionaldehyde, butyraldehyde, isobutyraldehyde, heptaldehyde, 2-ethylhexaldehyde, octylaldehyde, isooctylaldehyde, nonylaldehyde, 3,5,5-trimethylhexaldehyde, dodecylaldehyde, and similar aldehydes in which R° is hydrogen or an alkyl group of one to eight carbon atoms or more. Aliphatic aldehydes having an unreactive substituent such as a tertiary amine group or ether group may likewise be used.

Typical aminoaldehydes include 3-dimethylamino-2,2-dimethylpropionaldehyde, 3-diethylamino-2,2-dimethylpropionaldehyde, 3(N-methyl - N - octylamino) - 2,2 - dimethylpropionaldehyde, 3-dibutylamino-2,2 - dimethylpropionaldehyde, 3-morpholino-2,2 - dimethylpropionaldehyde, 3-pyrrolidino - 2,2 - dimethylpropionaldehyde, 3-piperidino-2,2-dimethylpropionaldehyde, 2 - ethyl-2(dimethylaminomethyl) hexaldehyde, 2 - ethyl - 2(diethylaminomethyl) hexaldehyde, 2 - ethyl - 2(dimethylaminomethyl) butyraldehyde, 2 - ethyl-2(dipropylaminomethyl) butyraldehyde, 2-ethyl-2(morpholinomethyl) butyraldehyde, 2-methyl - 2(dimethylaminomethyl) butyraldehyde, and the like. Typical of ether-containing aldehydes are methoxyacetaldehyde and butoxyacetaldehyde.

Aromatic aldehydes form another class of important reactants. This class includes benzaldehyde, chlorobenzaldehyde, bromobenzaldehyde, methoxybenzaldehyde, methylbenzaldehyde, butylbenzaldehyde, and other benzaldehydes having relatively unreactive ring substituents. A particularly important substituted benzaldehyde is piperonal.

To effect the reaction of aldehyde and 2-ketopiperazine the two reactants are mixed, preferably in about equivalent weights, although some excess of either may be used. There is reacted with these materials formic acid in an amount at least equivalent to the amine group. Excess acid may, if desired, be added, but the excess should desirably be removed or be neutralized in the reacted mixture before separation of the product. Reaction is best effected between about 50° and 180° C. When aliphatic aldehydes are used, the best range of temperatures is between 50° and about 130° C. With aromatic aldehydes temperatures from 100° to 180° C. are suitable. While the reaction may often be started at the bottom of these ranges, heat of reaction usually raises the temperature of the reaction mixture. The reaction can be completed by heating under reflux. Carbon dioxide is evolved and completion of reaction is indicated when in the presence of acid, carbon dioxide is no longer evolved.

The invention is illustrated by the following typical preparations of N-substituted ketopiperazines.

Example 1

To a stirred mixture of 25.6 parts of 3,3-dimethyl-2-ketopiperazine and 6.6 parts of paraformaldehyde, heated on a steam bath, there was slowly added formic acid to a total of 9.2 parts. Carbon dioxide was copiously evolved. The said ketopiperazine may conveniently be prepared from ethylenediamine, acetone, and hydrogen cyanide as described in application Serial No.

270,761, filed February 8, 1952, by Strong et al. and assigned to a common assignee. Paraformaldehyde is, of course, a convenient source of formaldehyde.

The reaction mixture was separated by distillation. The fraction taken at 154°–156° C./12 mm. proved to be 3,3,4-trimethyl-2-ketopiperazine. The distillate solidified and was recrystalized from isopropanol. The crystals thus obtained melted at 128°–130° C. By analysis they contained 19.2% of nitrogen (theory 19.7%). This compound has the structure

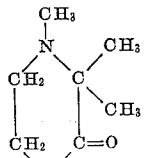

Example 2

There were mixed 51.2 parts of 3,3-dimethyl-2-ketopiperazine and 31.7 parts of isobutyraldehyde. The mixture was warmed and treated with 23 parts of formic acid. The mixture was heated until the evolution of carbon dioxide ceased. A solid formed. It was recrystallized from isopropanol to give 39.5 parts of 4-isobutyl-3,3-dimethyl-2-ketopiperazine, which by analysis contained 15.1% of nitrogen (theory 15.2%) and melted at 135°–137° C.

Example 3

There were mixed 68.4 parts of 3-methyl-2-ketopiperazine and 92.3 parts of 3,5,5-trimethylhexaldehyde. The mixture was heated to 100° C. and there were added thereto over a 15 minute period 32.2 parts of 99% formic acid. The reaction mixture was then heated at about 100° C. for two hours and was distilled. At 154°–157° C./0.3 mm. there was obtained a yellow oil which corresponded in composition to 3-methyl-4(3,5,5-trimethylhexyl)-2-ketopiperazine. The nitrogen content of the distillate was found as 11.5% (theory 11.7%).

A solution was made from 25 parts of official test insecticide (O. T. I.), one part of the above compound, and 74 parts of deodorized kerosene. The solution was examined according to the standard Peet-Grady test. It gave a knockdown of flies of 82% compared with a 58% knockdown for a 25% solution of O. T. I. in kerosene.

Example 4

In a similar manner there were reacted 51.2 parts of 3,3-dimethyl-2-ketopiperazine, 62.5 parts of nonylaldehyde, and 23 parts of formic acid. The product was separated by distillation. At 212°–214° C./25 mm. a fraction was taken which corresponded in composition to 3,3-dimethyl-4(3,5,5-trimethylhexyl)-2-ketopiperazine. The distilled product solidified. It melted at 85°–88° C. It was recrystallized from ethyl acetate and the product then melted at 99°–100° C. It contained by analysis 11.2% of nitrogen (theory 11.1%).

The above compound was used in the preparation of an insecticidal composition, one part thereof being taken up with 25 parts of O. T. I. and 74 parts of kerosene. In the Peet-Grady test this composition gave a knockdown of flies of 92% and a kill of +6 compared to O. T. I. A composition consisting of 25 parts of O. T. I. and 75 parts of kerosene gave a knockdown of 58%.

Example 5

A mixture of 51.2 parts of 3,3-dimethyl-2-ketopiperazine, 62 parts of p-chlorobenzaldehyde, and 23 parts of formic acid was heated under reflux for eight hours. When the reaction mixture became cool, it solidified. It was recrystallized from isopropanol to yield 53 parts of colorless crystals. These melted at 201°–203° C. and corresponded in composition to 3,3-dimethyl-4-p-chlorobenzyl-2-ketopiperazine. Analysis of the crystals showed a nitrogen content of 13.7% (theory 14.0%) and a chlorine content of 11.0% (theory 11.1%).

Example 6

A mixture of 25.6 parts of 3,3-dimethyl-2-ketopiperazine, 30 parts of piperonal, and 9.2 parts of formic acid was heated for an hour with reflux. The temperature of the reaction mixture was 135° C. The mixture was cooled to yield a solid which was recrystallized from isopropanol. There was obtained 15 parts of 3,3-dimethyl-4-piperonyl-2-ketopiperazine, melting at 187°–190° C. The product had a neutral equivalent of 274 (theory 262) and contained by analysis 10.5% of nitrogen (theory 10.7%).

The above compound was examined in a fly spray based on the O. T. I. as above. A 1% solution of this compound with 25% of O. T. I. gave a knockdown of flies in the Peet-Grady test of 99% and a kill of +18 compared to the kill secured with O. T. I. The knockdown of a 25% solution of O. T. I. alone was 58%.

Example 7

To a mixture of 51.2 parts of 3,3-dimethyl-2-ketopiperazine and 62.4 parts of 2,2-dimethyl-3-dimethylaminopropionaldehyde (prepared by the Mannich reaction from isobutyraldehyde, formaldehyde, and dimethylamine hydrochloride, cf. Mannich, Lesser, and Silten, Ber. 65, 378 (1932)) was added 23 parts of 95% formic acid over a period of 30 minutes. The mixture was heated at reflux for 2.5 hours, low boiling materials were stripped off, and the product was distilled at 113°–126° C./1.5 mm. It corresponded in composition to 4-(2,2-dimethyl-3-dimethylaminopropyl)-3,3-dimethyl-2-ketopiperazine. This fraction amounted to 31 parts. It solidified to yield a light tan solid which melted at 85°–92° C.

The following details are given of the preparation of a typical methylol derivative. A mixture of 42.5 parts of 3,3,4-trimethyl-2-ketopiperazine, 28 parts of aqueous 37% formaldehyde solution, and 0.2 part of an aqueous 50% potassium hydroxide solution was heated for five hours on a steam bath under reflux. The reaction mixture was stripped under reduced pressure to yield 42 parts of a colorless solid melting at 85°–89° C. After recrystallization the solid melted at 93°–100° C. It corresponded fairly closely in composition to 3,3,4-trimethyl-1-hydroxymethyl-2-ketopiperazine.

I claim:

1. As new chemical substances compounds of the formula

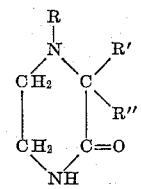

wherein R represents a member of the class consisting of alkyl groups of not over 12 carbon atoms, dialkylaminoalkyl groups, the alkyl substituents thereof each containing not over eight carbon atoms, and benzyl groups and R' and R'' represent members of the class consisting of hydrogen and lower alkyl groups.

2. As a new chemical compound,

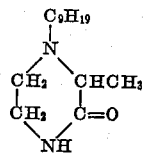

3. As a new chemical compound,

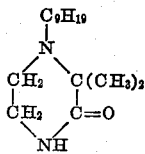

4. As a new chemical compound,

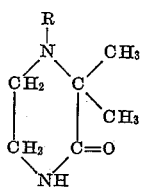

where R is the piperonyl group.

5. As a new chemical compound,

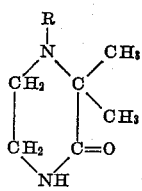

where R is the chlorobenzyl group.

6. As a new chemical compound,

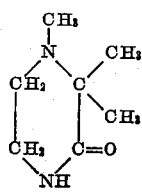

7. A process for preparing compounds of the formula

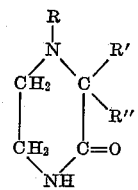

which comprises reacting between 50° and 180° C. a ketopiperazine of the formula

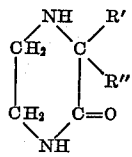

an aldehyde, R°CHO, and formic acid, R° representing a member of the class consisting of hydrogen, alkyl groups of not over 11 carbon atoms, phenyl groups, no alkyl substituent thereof containing over eight carbon atoms, and dialkylaminoalkyl groups and R' and R'' representing members of the class consisting of lower alkyl groups.

8. A process of preparing 3-methyl-4-nonyl-2-ketopiperazine which comprises reacting between 50° and 150° C. nonylaldehyde, formic acid, and 3-methyl-2-ketopiperazine.

9. A process for preparing 3,3-dimethyl-4-nonyl-2-ketopiperazine which comprises reacting between 50° and 150° C. nonylaldehyde, formic acid, and 3,3-dimethyl-2-ketopiperazine.

10. A process for preparing 3,3-dimethyl-4-piperonyl-2-ketopiperazine which comprises reacting between 100° and 180° C. piperonal, formic acid, and 3,3-dimethyl-2-ketopiperazine.

11. A process for preparing 3,3-dimethyl-4-chlorobenzyl-2-ketopiperazine which comprises reacting between 100° and 180° C. chlorobenzaldehyde, formic acid, and 3,3-dimethyl-2-ketopiperazine.

12. A process for preparing 3,3,4-trimethyl-2-ketopiperazine which comprises reacting between 50° and 150° C. 3,3-dimethyl-2-ketopiperazine, formaldehyde, and formic acid.

PETER L. DE BENNEVILLE.

No references cited.